(12) United States Patent
Smyj (10) Patent No.: US 6,360,448 B1
(45) Date of Patent: Mar. 26, 2002

(54) SYSTEM FOR LAYING OUT AN INSTALLATION OF COMPONENTS AND METHOD OF USE

(76) Inventor: Brian Kenneth Smyj, 30 Lorenzen St., Larchmont, NY (US) 10538

( * ) Notice: Subject to any disclaimer, the term of this patent is extended or adjusted under 35 U.S.C. 154(b) by 0 days.

(21) Appl. No.: 09/314,770

(22) Filed: May 19, 1999

(51) Int. Cl.[7] ................................................ G01B 3/20
(52) U.S. Cl. ............................ 33/562; 33/434; 33/758
(58) Field of Search ......................... 33/562, 563, 566, 33/528, 710, 758, 759, 486, 494, 755, 613, 645

(56) References Cited

U.S. PATENT DOCUMENTS

| | | | |
|---|---|---|---|
| 3,936,944 A | 2/1976 | Byne | 33/758 |
| 4,149,320 A | 4/1979 | Troyer et al. | 33/758 |
| 4,301,596 A | 11/1981 | Sedlock | 33/494 |
| 4,351,113 A | 9/1982 | Eggertsen et al. | 33/758 |
| 4,353,759 A * | 10/1982 | Stallings | 33/563 |
| 4,367,590 A | 1/1983 | Winter et al. | 33/758 |
| 4,499,666 A | 2/1985 | Smith | 33/494 |
| 4,811,489 A * | 3/1989 | Walker | 33/759 |
| 4,827,621 A | 5/1989 | Borsuk | 33/494 |
| 4,845,858 A | 7/1989 | Thomas | 33/759 |
| 4,942,670 A | 7/1990 | Brandt | 33/494 |
| 5,012,590 A | 5/1991 | Wagner et al. | 33/759 |
| 5,107,601 A | 4/1992 | Semchuck | 33/759 |
| 5,129,153 A * | 7/1992 | Burns, Sr. | 33/613 |
| 5,230,158 A * | 7/1993 | Wall | 33/494 |
| 5,452,523 A | 9/1995 | Jansen | 33/494 |
| 5,627,763 A | 5/1997 | Carlson | 364/512 |
| 5,632,095 A | 5/1997 | Day | 33/494 |
| 5,666,737 A * | 9/1997 | Ryan, III | 33/562 |
| 5,819,422 A | 10/1998 | Schafer | 33/1 B |
| 5,884,408 A * | 3/1999 | Simmons | 33/494 |
| 5,913,586 A * | 6/1999 | Marshall | 33/759 |
| 2001/0013178 A1 * | 8/2001 | Lafrance | 33/562 |

* cited by examiner

Primary Examiner—Diego Gutierrez
Assistant Examiner—Gai Verbitsky
(74) Attorney, Agent, or Firm—Price and Gess

(57) ABSTRACT

The present invention relates to a construction tool for laying out components of a structure. The system comprises a length of tape comprising a first calibrated edge and a second calibrated edge separated by a width sufficient in size so that said first and second calibrated edges remain visible after installation of the components of the structure; a plurality of stud placement indicators marked on said length of tape at periodic intervals; a leader depending from a zero line of the first and second calibrated edges, said leader comprising a length and a plurality of graduated lines indicating the length of the leader; an adhesive backing; and at least one overlay label connectable to the length of tape and comprising a length sufficient in size so that a symbolic indicator will remain visible after installation of the components of the structure, a width substantially equivalent in size to a dimension of a component of the structure, an adhesive backing, and a symbolic indicator for placement of a component of the structure; said symbolic indicator comprising an architectural symbol representing the component of the structure. The system allows tradesmen to locate (and avoid) other components of the structure after the surfacing component has been installed and the walls enclosed, for purposes of repair or later component installation. The device solves the need for re-measurement of dimensions of the structure. The device is further used in a novel method for laying out structures comprising at least one wall.

20 Claims, 10 Drawing Sheets

FIG. 6A

CLIMATE-CONTROL SYMBOLS

| Symbol | Name | Symbol | Name |
|---|---|---|---|
| ——— | DUCT SIZE FLOW DIRECTION | R | HEAT REGISTER |
| —⊃— | DUCT SIZE CHANGE | T | THERMOSTAT |
| ⇥D  ⇤D | DUCT LOWERING | RAD | RADIATOR |
| R⇥  R⇤ | DUCT RISING | CONV | CONVECTION |
| S | DUCT RETURN | RAC | ROOM AIRCONDITIONER |
| ⊠ | DUCT SUPPLY | ☐ | HEATING PLANT FURNACE |
| ○ | CEILING DUCTOUTLET | OIL | FUEL OIL TANK |
| ⇤WA | WARM AIR SUPPLY | H | HUMIDSTAT |
| ⇩CA | 2ND FLOOR SUPPLY | HP | HEAT PUMP |
| ⇩ | COLD AIR RETURN | T | THERMOMETER |
| | 2ND FLOOR RETURN | ☐ | PUMP |
| ⊢G | GAS OUTLET | ⊙ | GAGE |
| ∿ | HEAT OUTLET | ⊣⊢ | FORCED CONVECTION |

SANITARY FACILITIES SYMBOLS

| Symbol | Name |
|---|---|
| —Ⓜ— | METER |
| ☐ FD | FLOOR DRAIN |
| ○↑ | CESS POOL |
| ◌↑ | DRY WELL |
| ▯ | SEPTIC TANK |
| ▯ | SEPTIC TANK DISTURBUTION BOX |
| Ⓢ⊗ᴾ | SUMP PIT |

FIG. 6B

DOOR SYMBOLS

| Symbol | Name |
|---|---|
| | INTERIOR HINGED DOOR HOLLOW CORE |
| | EXTERIOR HINGE DOOR SOILD CORE |
| | DOUBLE ACTION DOOR |
| | BYPASSING SLIDING DOOR |
| | DOUBLE FRENCH DOORS |
| | SLIDING POCKET DOOR |
| | BIFOLDING DOORS |
| | ACCORIAN |
| | ARCH (CASED OPENINGS) |
| | DUTCH DOOR |
| | OVERHEAD DOOR |
| | TWO-LEAF GARAGE DOOR |
| | FOUR-LEAF GARAGE DOOR |
| | SECTIONAL ROLL-UP GARAGE DOOR |

PIPE JOINT SYMBOLS

| Symbol | Name |
|---|---|
| | FLANGED FITTING |
| | SCREWED FITTINGS |
| | BELL AND SPIGOT FITTING |
| | WELDED FITTING |
| | SOLDERED FITTING |
| | JOINT |
| | MOTOR OPERATED VEHICLE |

FIG. 7A

ELECTRICAL SYMBOLS

| | | | |
|---|---|---|---|
| WATERHEATER OUTLET |  | FIRE ALARM |  |
| WALL BRACKET LIGHT WITH SWITCH |  | FAN |  |
| LIGHTING FLUORESCENT |  | SERVICE PANLE WITH SWITCHES |  |
| EXIT LIGHT |  | LIGHTING DISTRIBUTION PANEL FUSES |  |
| ILLUMENATED HOUSE NUMBER |  | ELECTRIC HEATER |  |
| CLOCK OUTLET |  | JUNCTION BOX |  |
| BUZZER |  | POWER LINE SWITCH TO OUTLET |  |
| CHIME |  | | |

PIPE INTERSECTION SYMBOLS

| | | | |
|---|---|---|---|
| DOUBLE BRANCH ELBOW |  | COUPLING |  |
| STRAIGHT CROSS |  | ELBOW 90° |  |
| SAFETY VALVE |  | ELBOW 45° |  |
| GATE VALVE |  | TEE 90° |  |
| HAND VALVE |  | LATERAL 45° |  |
| PIPE OUTLET UP |  | CLEAN OUT |  |
| PIPE OUTLET DOWN |  | REDUCER |  |

FIG. 8B

WINDOW SYMBOLS

| Symbol | Name | Symbol | Name |
|---|---|---|---|
| | DOUBLE HUNG WINDOW | | DOUBLE CASEMENT WINDOW |
| | HORIZONTAL SLIDING WINDOW | | COMBINATION WINDOW FIXED WINDOW WITH DOUBLE HUNG SIDES |
| | AWNING WINDOW | | 45° BAYWINDOW DOUBLE HUNG |
| | SWINGING CASEMENT WINDOW | | SQUARE BAY WINDOW FIXED WINDOW WITH JALOUSIE SIDES |
| | HOPPER WINDOW | | BOW CASEMENT BAY WINDOW |
| | JALOUSIE WINDOW | | TRIPLE COMBINATION FIXED AND HOPPER |
| | DOUBLE DOUBLE HUNG WINDOW | | GLASS BLOCK WINDOW BRICKWALL |

ELECTRICAL SYMBOLS

| Symbol | Name |
|---|---|
| S | SWITCH SINGLE POLE |
| $S_2$ | SWITCH DOUBLE POLE |
| $S_3$ | SWITCH THREE WAY |
| $S_4$ | SWITCH FOUR WAY |
| $S_{WP}$ | SWITCH WEATHERPROOF |
| $S_D$ | SWITCH AUTOMATIC DOOR |
| $S_P$ | SWITCH |

FIG. 8C  ELECTRICAL SYMBOLS

| | | | |
|---|---|---|---|
| SWITCH LOW VOLTAGE SYSTEM |  | THREE SWITCHES |  |
| SWITCH CIRCUIT BREAKER |  | TELEVISION AERIAL OUTLET |  |
| SWITCH LOW VOLTAGE MASTER |  | RADIO AERIAL OUTLET |  |
| TWO SWITCHES |  | OUTLET WITH SWITCH |  |
| DUPLEX OUTLET |  | SPLIT WIRE OUTLET |  |
| SINGLE OUTLET |  | FLOOR OUTLET |  |
| TRIPLE OUTLET |  | GARBAGE DISPOSAL OUTLET |  |
| WEATHERPROOF OUTLET |  | DISHWASHER OUTLET |  |
| HEAVY DUTY OUTLET 220 VOLTAGE |  | SPECIAL PURPOSE OUTLET 110 VOLTAGE |  |
| DISHWASHER OUTLET |  | REFRIGRATOR OUTLET |  |

SYSTEM FOR LAYING OUT AN INSTALLATION OF COMPONENTS AND METHOD OF USE

BACKGROUND OF THE INVENTION

1. Technical Field

The present invention relates generally to a construction tool for laying out components of a structure. More particularly, the present invention relates to a system for laying out dimensions for the location of studs, electrical components, plumbing components and other components of a construction project such as a house or commercial building.

2. Background Art

In constructing a building, the construction project foreman reads a set of architectural drawings, plans, or blue prints, to obtain the location of the layout for a structure whether the construction is commercial, residential or otherwise. The drawings show the size and outline of the structure, as well as the location and size of the interior partitions, doors, windows, and stairs. The drawings also show, inter alia, the location of electrical, plumbing and HVAC components.

The foreman must measure and mark the lay out of the structure on its base, usually a foundation. First, the foreman typically measures the layout on the base using architectural drawings as his guide. The foreman then marks the layout of the structure on the base with a chalk line. The framing carpenter then remeasures the dimensions of the structure to erect the building frame including the top plate, base plate and studs. After the frame is erected, the tradesmen, e.g. plumbers, electricians, drywallers, then re-measure the dimensions of the structure to position and install their components of the structure. The electrical conduit, water pipes and other components of the structure are then erected.

However, the drawback to this method is that each tradesman must re-measure the location of the components he or she is installing according to the details of the architectural drawings. For example, after the top plate, base plate and structural frame of the structure are erected, the electrician will have to locate and re-measure the position of the electrical conduit from the architectural drawings. Thus, the most common prior art method of construction lay out has numerous opportunities for measurement errors to be made.

A number of tools have been developed to address this problem and other problems related to laying out the dimensions and components for a structure. See U.S. Pat. Nos. 3,936,944, 4,149,320, 4,301,596, 4,351,113, 4,367,590, 4,845,858, 4,499,666, 4,827,621, 4,942,670, 5,012,590, 5,107,601, 5,452,523, 5,627,763, 5,632,095, 5,666,737, and 5,819,422. However, these tools are either inflexible to non-standard component dimensions, do not eliminate the need to re-measure dimensions, or do not allow for the lay out of components beyond framing studs, such as plumbing and electrical conduit. Other prior art tools also do not allow the tradesmen to locate (and avoid) other components of the structure after the surfacing component, such as sheetrock, has been installed and the walls enclosed, for purposes of repair or later component installation. A need exists for a lay out system which places the dimensions of the structure permanently on the base of the structure so that the system remains visible for each tradesman to erect his or her assigned components of the structure without need for re-measurement of the dimensions of the structure.

SUMMARY OF THE INVENTION

The present invention is a lay out system that places the dimensions of the structure permanently on the base of the structure so that the system remains visible for each tradesman to erect his or her assigned components of the structure without need for re-measurement of the dimensions of the structure. The system allows tradesmen to locate (and avoid) other components of the structure after the surfacing component, such as sheetrock, has been installed and the walls enclosed, for purposes of repair or later component installation. The device is further used in a novel method for laying out structures comprising at least one wall.

A preferred embodiment of the invention comprises a length of tape comprising a first calibrated edge and a second calibrated edge separated by a width sufficient in size so that said first and second calibrated edges remain visible after installation of the components of the structure; a plurality of stud placement indicators marked on said length of tape at periodic intervals; a leader depending from a zero line of the first and second calibrated edges, said leader comprising a length and a plurality of graduated lines indicating the length of the leader; an adhesive backing; and at least one overlay label connectable to the length of tape and comprising a length sufficient in size so that a symbolic indicator will remain visible after installation of the components of the structure, a width substantially equivalent in size to a dimension of a component of the structure, an adhesive backing, and a symbolic indicator for placement of a component of the structure, said symbolic indicator comprising an architectural symbol representing the component of the structure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a system for laying out components of a structure and a method of use.

Figure 1:
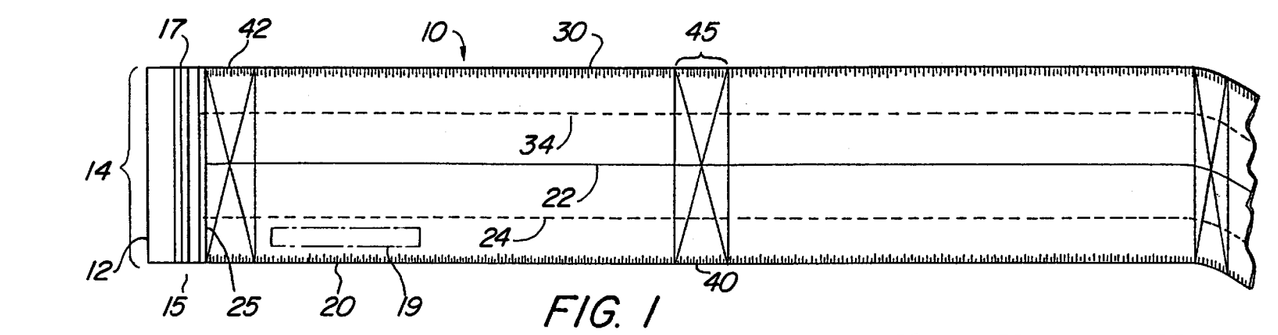
FIG. 1 is a top view of a preferred embodiment of the tape.

Referring now to FIG. 1, a length of tape 10 is shown with a first calibrated edge 20 and a second calibrated edge 30 separated by a pre-determined width 14. The tape 10 can be made of any material sufficient to withstand wear and tear at a construction site including, but not limited to, cloth, metal, plastic, paper, laminated paper, duct tape, packing tape, wood, vinyl or rubber. The preferred embodiment of the tape 10 resists distortion so that measurement tolerances of ±⅛ inch are maintained when the tape 10 is applied. The tape 10 can be dispensed from a roll or folded stack. An alternative embodiment of the tape 10 can also be peeled from a non-adhesive layer. The first and second calibrated edges 20, 30 can denote English, Metric or non-standard measures of length. The preferred embodiment described herein uses the English scale of measurement (inches and feet). The preferred embodiment shown in FIG. 1 demonstrates stud placement indicators 40 placed at periodic intervals on the length of tape 10. Customarily employed spacing between studs in wall framing construction is 12, 16 and 24 inches "on-center." In the preferred embodiment in FIG. 1, the interval is sixteen inches from the center of each stud placement indicator 40 to the next. In the preferred embodiment, the stud indicators 40 are boxes with an "X" through them marked on the tape 10.

Figure 1A:
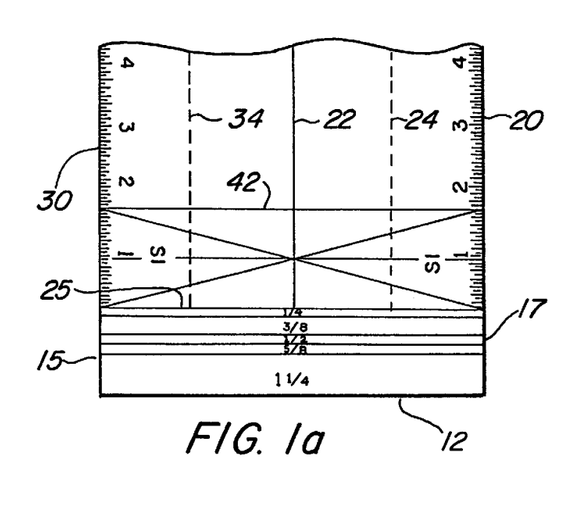
FIG. 1a is a rotated, close up view of the end of a preferred embodiment of the tape in FIG. 1.

Referring to FIG. 1a, an end 12 of the length of tape 10 is shown. The end 12 comprises a leader 15 and a graduated series of lines 17. The lines 17 indicate the width of surfacing component thickness to which the first stud placement indicator 42 will abut. Examples of surfacing component include but are not limited to sheetrock, particleboard, plywood, laminated board, slate wall, and masonite. The graduated lines for the preferred embodiment indicate surfacing component thickness of ¼", ⅜", ½", ⅝" and 1¼" (or double ⅝").

In the preferred embodiment, an information box 19 is located above the first calibrated edge 20 next to the first stud placement indicator 42. In the preferred embodiment, the information box 19 contains information indicating the width 14 of the tape 10, the length of the tape 10, the total number of stud placement indicators 40 on the tape 10 and a space where the user can enter a number, letter or symbol identifying the specific wall of the structure represented by the tape 10.

Alternative embodiments of the invention comprise a tape width 14 that corresponds to 2"×4" wood studs with attached surfacing components of standard thickness, i.e. ¼", ⅜", ½", ⅝" or 1¼" thickness, affixed to both sides of the studs. The information box 19 for the alternative embodiment of the invention further indicates the thickness of the surfacing component with which the tape 10 should be used.

FIG. 1a shows that the edge of the first stud indicator 42 is set at a zero line 25 for both the first calibrated edge 20 and the second calibrated edge 30. The preferred embodiment in FIG. 1a shows that the first stud indicator 42 is numbered "S1." Each subsequent stud indicator 40 is numbered to improve accounting for the total number of studs used for a structure in order to reduce waste and further control stud placement.

It is also noted that the placement of the first stud indicator 42 with its edge on the zero line 25 for the first and second calibrated edges 20, 30 will offset the first stud indicator 42 from the periodic distances of the other stud indicators 40. For example, in a sixteen inch on-center stud pattern layout, the center of the first stud indicator 42 is actually 15¼" from the center of the next stud indicator 40 which is placed with its center on the 16" mark for the first and second calibrated edges 20, 30.

Each stud indicator 40 in the preferred embodiment depicted has a width 45 equal to a standard 2"×4" wood stud, 1½ inches.

FIG. 1a also displays a centerline 22 and a first chalk line indicator 24 and a second chalk line indicator 34. In the preferred embodiment of the system, these lines assist in positioning the top plate and the base plate 100 of the frame over the centerline 22 of the tape 10. Alternative embodiments of the system have a color coded first chalk line indicator 24 and/or first calibrated edge 20 of one color and the second chalk line indicator 34 and/or second calibrated edge 30 are color coded with another color.

The preferred embodiment of the invention also has a self-adhesive backing opposite the side of the tape 10 with the first and second calibrated edges 20, 30. The self-adhesive backing should be sufficiently adhesive to hold the tape 10 to common bases used in construction including but not limited to wood, plywood, metal, and concrete.

Figure 2:
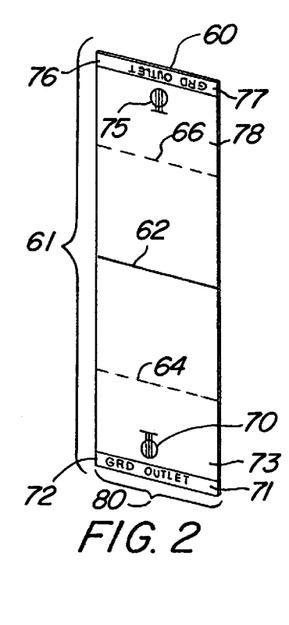
FIG. 2 is a perspective view of a preferred embodiment of the overlay label.

FIG. 2 depicts a preferred embodiment of an overlay label 60 for the layout system 10. The overlay label 60 can also be made of any material sufficient to withstand wear and tear at a construction site including but not limited to cloth, metal, plastic, paper, laminated paper, duct tape, packing tape, wood, vinyl, or rubber. The preferred embodiment of the overlay label 60 resists distortion so that measurement tolerances of ±⅛ inch are maintained when the overlay label 60 is applied. The preferred embodiment of the overlay label 60 has a self-adhesive backing opposite the side of the label 60 with the symbolic indicators 70. The self-adhesive backing should be sufficiently adhesive to hold the overlay label 60 on the tape 10. The preferred embodiment of the overlay label 60 has a centerline 62, a first chalk line indicator 64, and a second chalk line indicator 66. These lines 62, 64 and 66 are used to align the overlay label 60 with the centerline 22 and the first and second chalk line indicators 24 and 34 of the tape 10. The preferred embodiment of the overlay label 60 in FIG. 2 further comprises a first symbolic indicator 70 and a second symbolic indicator 75 on opposite ends of the overlay label 60. A first and second symbol description space 72 and 77 are also provided on the overlay label 60. These descriptions 72, 77 allow laymen without knowledge of architectural nomenclature to identify components installed within the structure. The overlay labels 60 can also be color-coded based on the components that the label 60 represents for easy identification. Overlay labels 60 can also be marked like stud indicators 40 so that they can be placed on the tape 10 in non-standard positions.

Figure 2A:
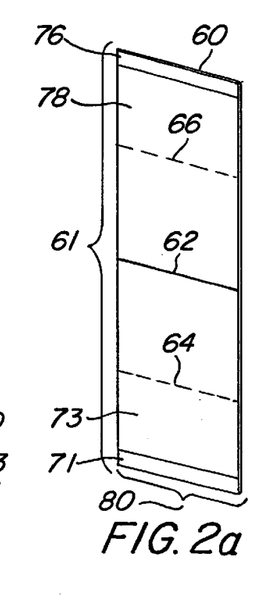
FIG. 2a is a perspective view of another preferred embodiment of the overlay label.
Figure 5:
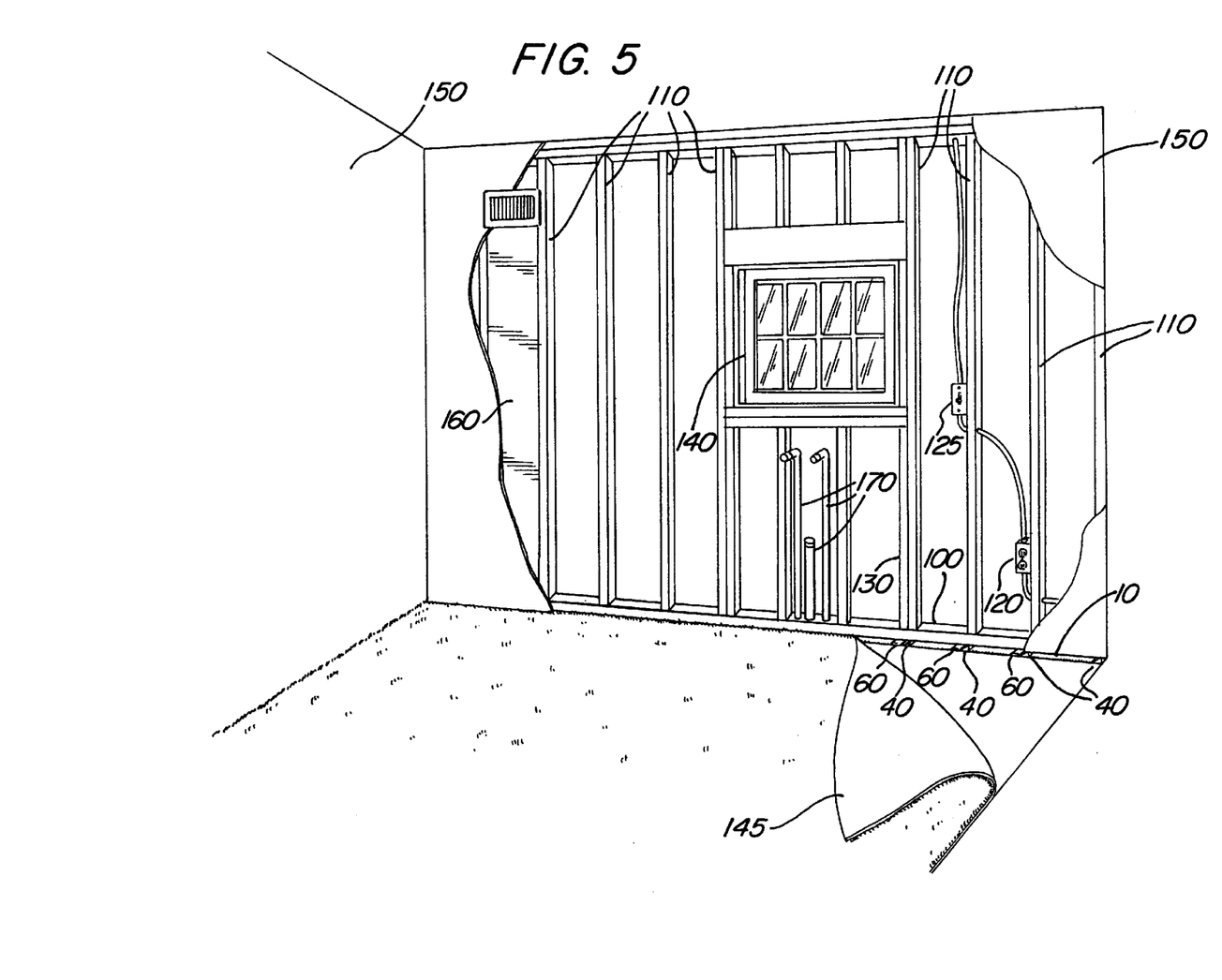
FIG. 5 is a view of a preferred embodiment of the invention installed and a cut away view of components indicated thereby.
Figure 6A:
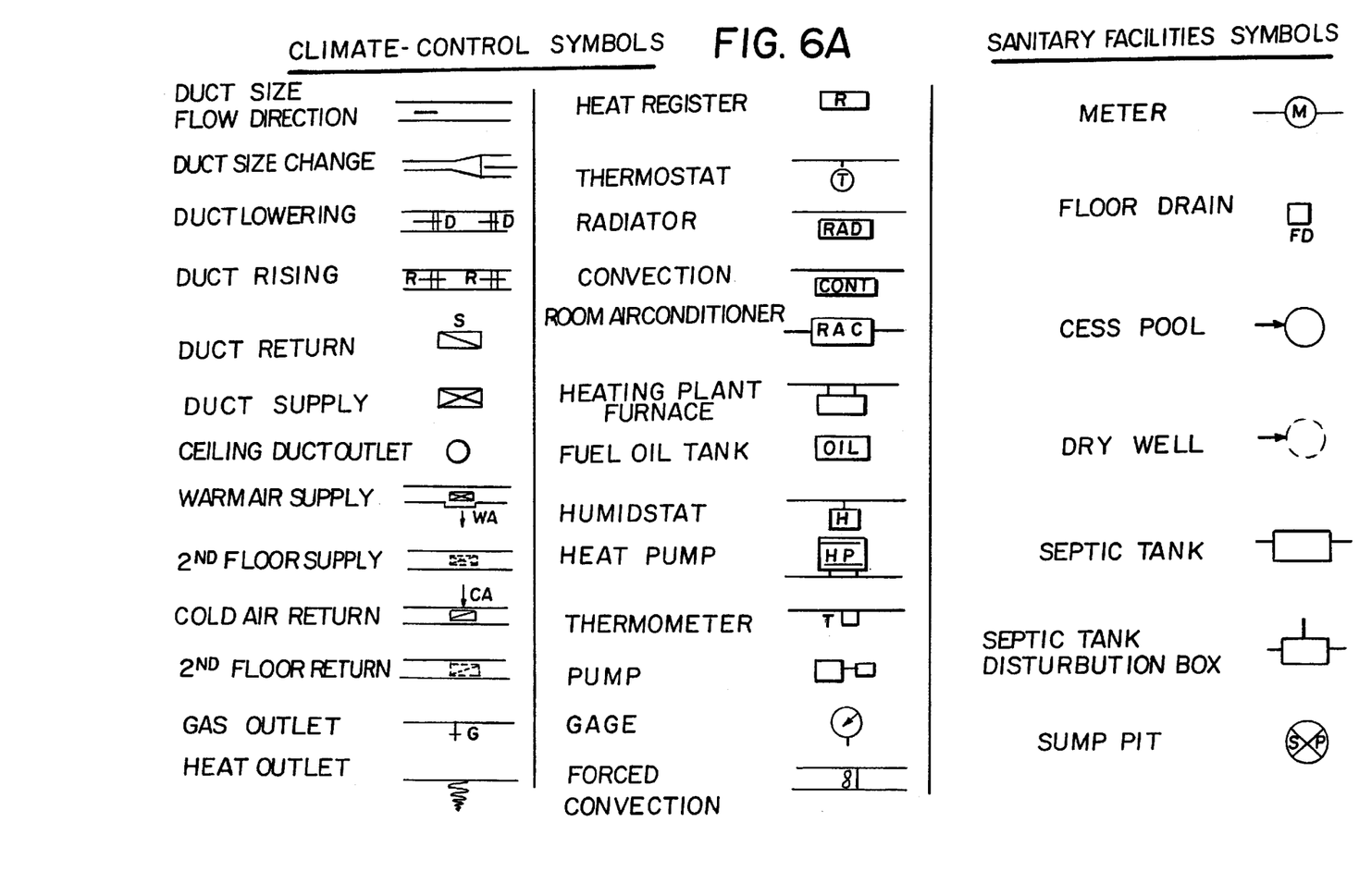
FIG. 6A is a list of preferred architectural symbols and descriptions for use on overlay labels.
Figure 6B:
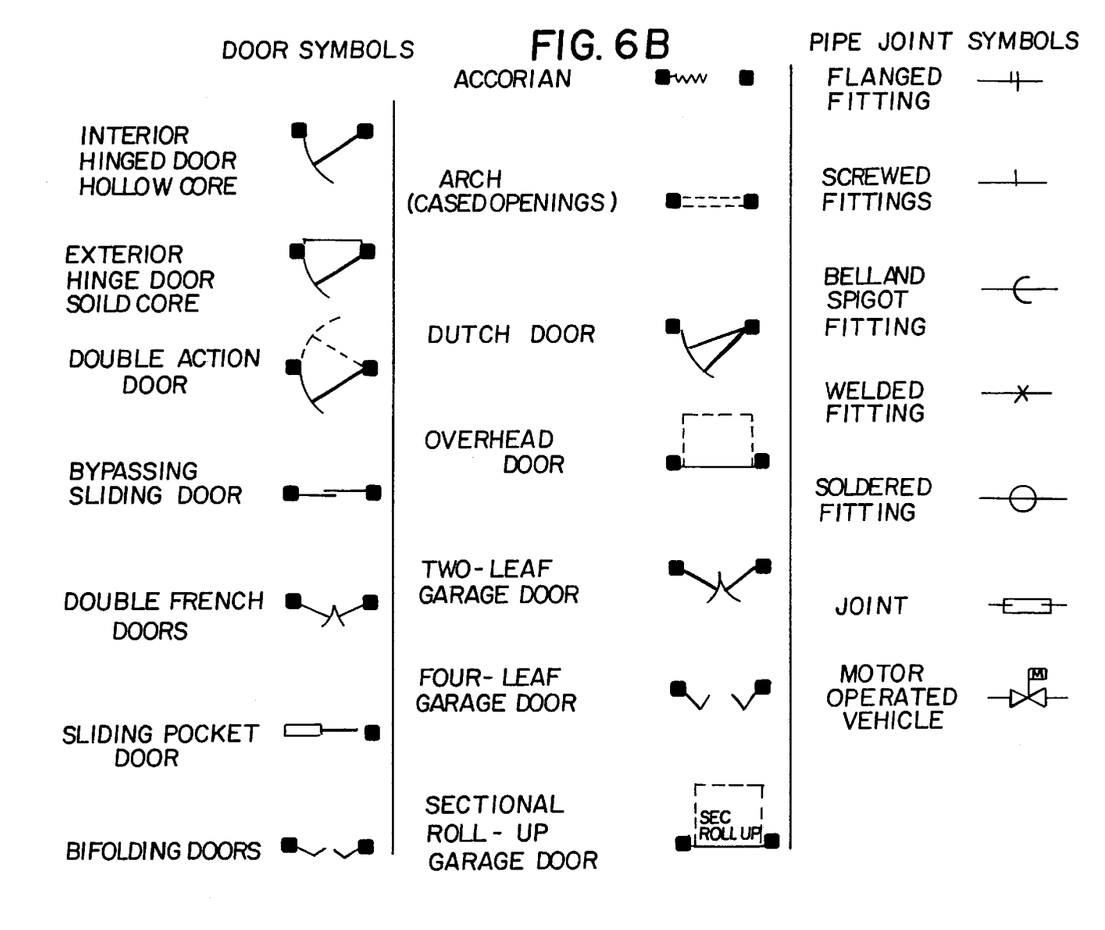
FIG. 6B is a list of preferred architectural symbols and descriptions for use on overlay labels.
Figure 7A:
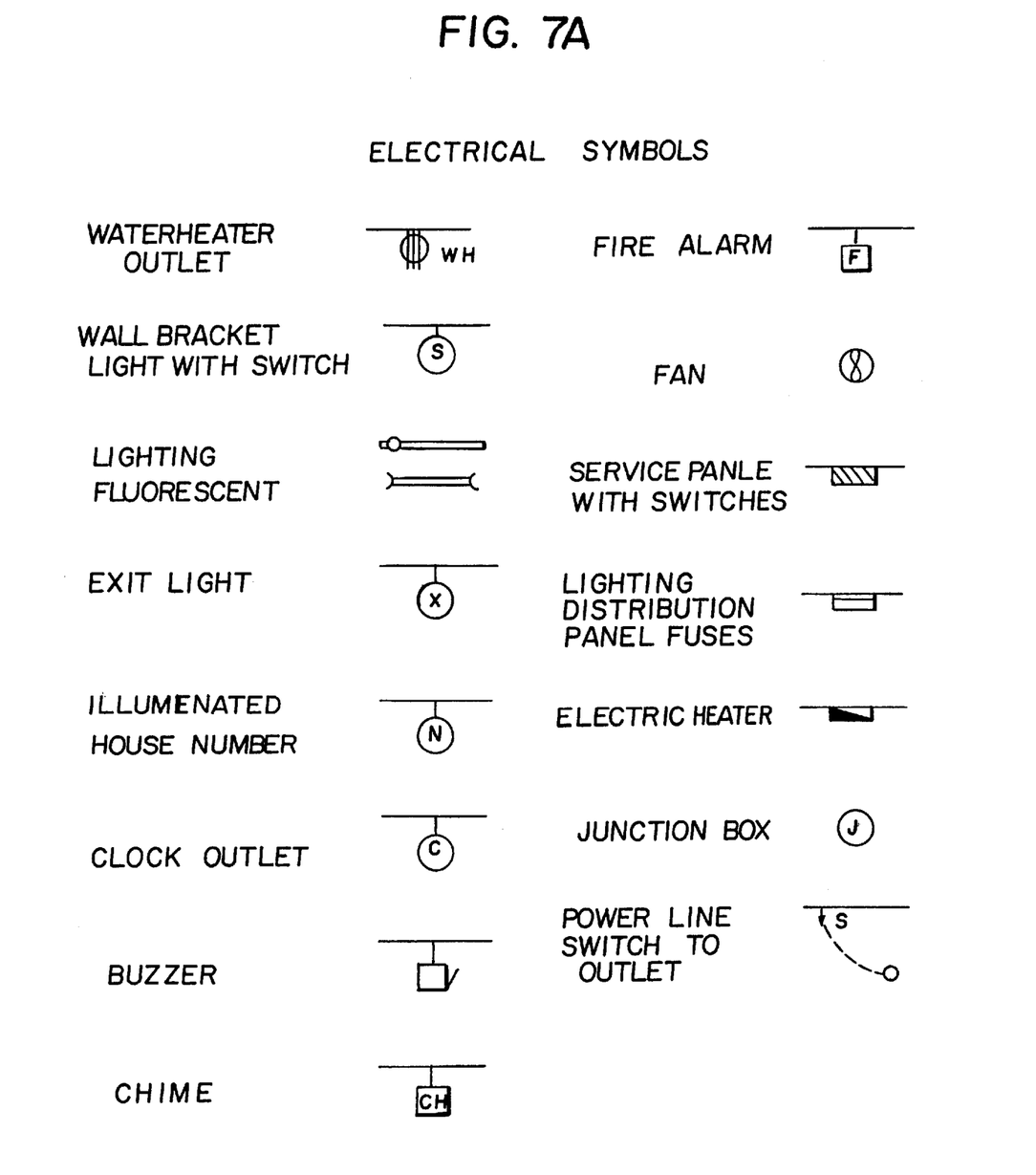
FIG. 7A is a list of preferred architectural symbols and descriptions for use on overlay labels.
Figure 7B:
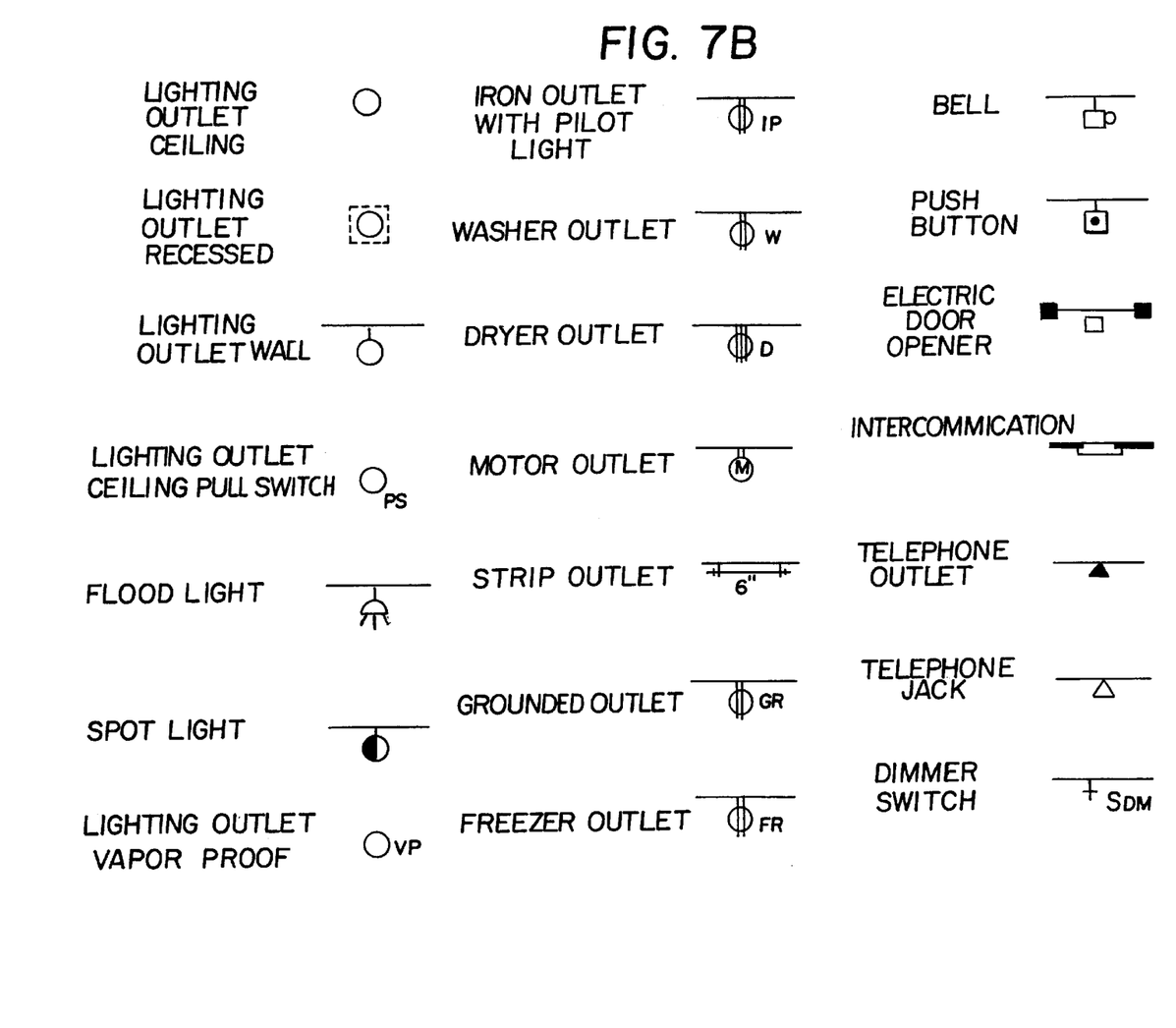
FIG. 7B is a list of preferred architectural symbols and descriptions for use on overlay labels.

In the preferred embodiment, the overlay label's length 61 matches the width 14 of the tape 10. This ensures that the symbolic indicators 70, 75, and the symbol description spaces 71, 76 are visible even after all components of the structure are installed. FIGS. 5, 6 and 7 show a list of common architectural symbols and descriptions thereof which can be pre-printed on overlay labels 60 as symbolic indicators 70 and 75 and descriptions 72 and 77. FIG. 2a is another preferred embodiment of an overlay label 60 where the space for the symbolic indicator 73 and 78 and the space for the description 71 and 76 are left blank. Blank overlay labels allow a user to enter his or her own symbolic indicator and description for unexpected or non-standard components.

Figure 3:
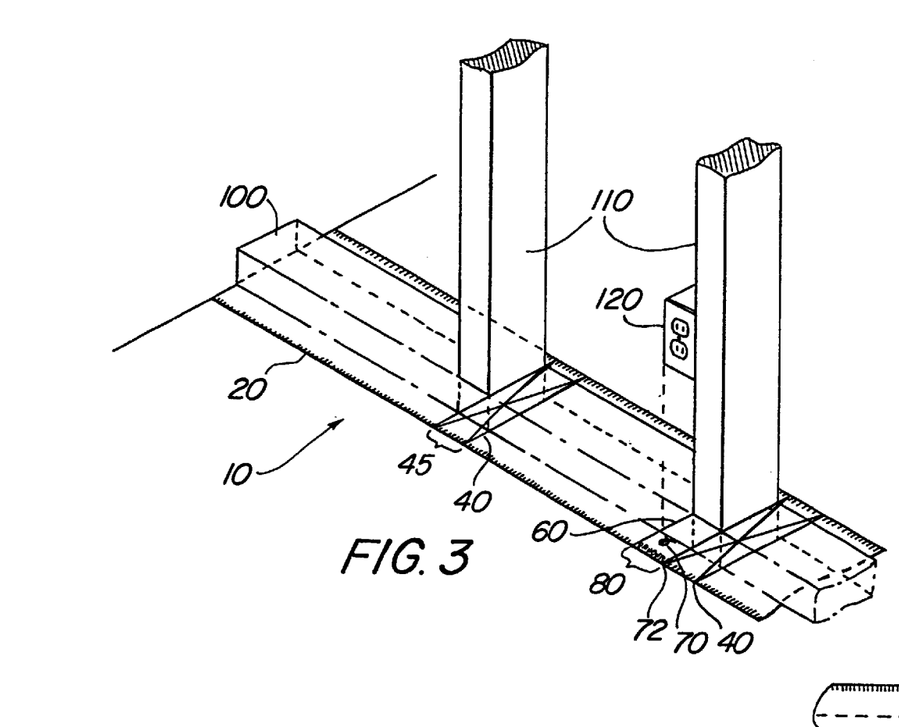
FIG. 3 is a perspective view of a preferred embodiment of the invention installed on the base of a structure with components of the structure installed over the embodiment.

It will also be noted that the overlay labels 60 have a width 80, which can be made to correspond to the width of the component indicated by the symbolic indicators 70 and 75. For example, the width 80 of an overlay label 60 for an electrical outlet can equal the standard width of an electrical outlet to allow other tradesmen to avoid placing other components of the structure, such as water pipes, within the area to be occupied by the indicated overlay label 60. This feature can reduce waste from repairs, damage to the structure from unnecessary component space conflicts, and danger from harmful component interaction. FIG. 3 is a perspective view of a preferred embodiment of the invention installed with a base plate 100, two studs 110 and a duplex outlet 120 installed over the embodiment.

Figure 4:
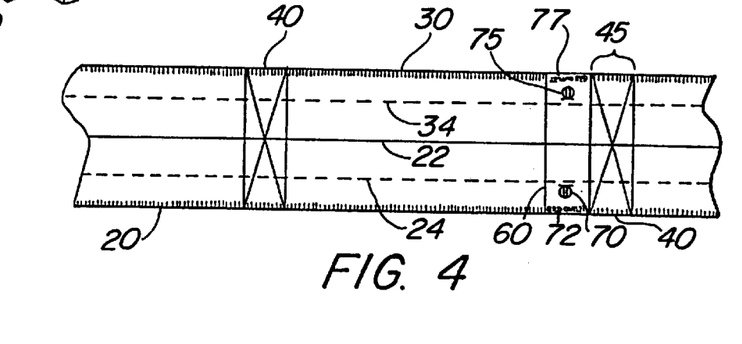
FIG. 4 is a partial top view of a preferred embodiment of the invention with an overlay label installed on a length of tape.

FIG. 4 is a top view of an overlay label 60 installed on a tape 10 next to a stud indicator 40. It is noted that the overlay labels 60 and the tape 10 can be at least partially transparent if overlapping markings are necessary.

The invention described herein also lends itself to a beneficial, preferred method of construction layout for a structure with at least one wall. First, a length of tape 10 is placed on a fixed base, typically a foundation or slab, where the floor plan of the structure has been previously chalked out on the base.

The second step comprises cutting the leader 15 of the length of tape 10 along one of the graduated lines 17 to indicate the thickness of the surfacing component, if any, to be adjacent to the wall or between the wall and an abutting wall. The first and second steps are repeated for each wall of the structure.

The third step comprises the placement of overlay labels 60. An overlay label 60 is placed across the width 14 of said length of tape 10 to indicate a location for a component of the structure. The third step is repeated for each component of the structure, e.g. electrical conduit, water pipes, and HVAC, along the length of tape 10 until each component of the structure is laid out on the tape 10.

Next, the components of the structure are installed over the tape 10 and said overlay labels 60 such that the first and second calibrated edges 20 and 30 of the length of tape 10, the symbolic indicators 70 and 75, and the symbolic descriptions 72 and 77 of the overlay labels remain visible after the components are installed.

FIG. 5 depicts further advantages of the invention. FIG. 5 shows the length of tape 10 installed with overlay labels 60 and stud placement indicators 40 indicating the installed components above them including studs 110, a duplex outlet 120, a light switch 125 and a cripple 130 for a window 140. Rolling back the carpet 145 further would also reveal overlay labels 60 for the HVAC component 160 and the plumbing components 170. The surfacing component 150, typically sheetrock, is not completely visible due to the cut away view of FIG. 5 so that the installed components of the structure are visible in relation to their respective overlay labels 60 and stud placement indicators 40. FIG. 5 shows that after the components of a structure are installed over the system and the surfacing component is applied to the studs 110, the components can still be located by moving any floor covering such as the carpet 145 depicted here and viewing the visible portion of the tape 10, stud placement indicators 40 and overlay labels 60. This feature provides the system with the advantage that installed components can be easily located for future repair, modification or removal.

Figure 8A:
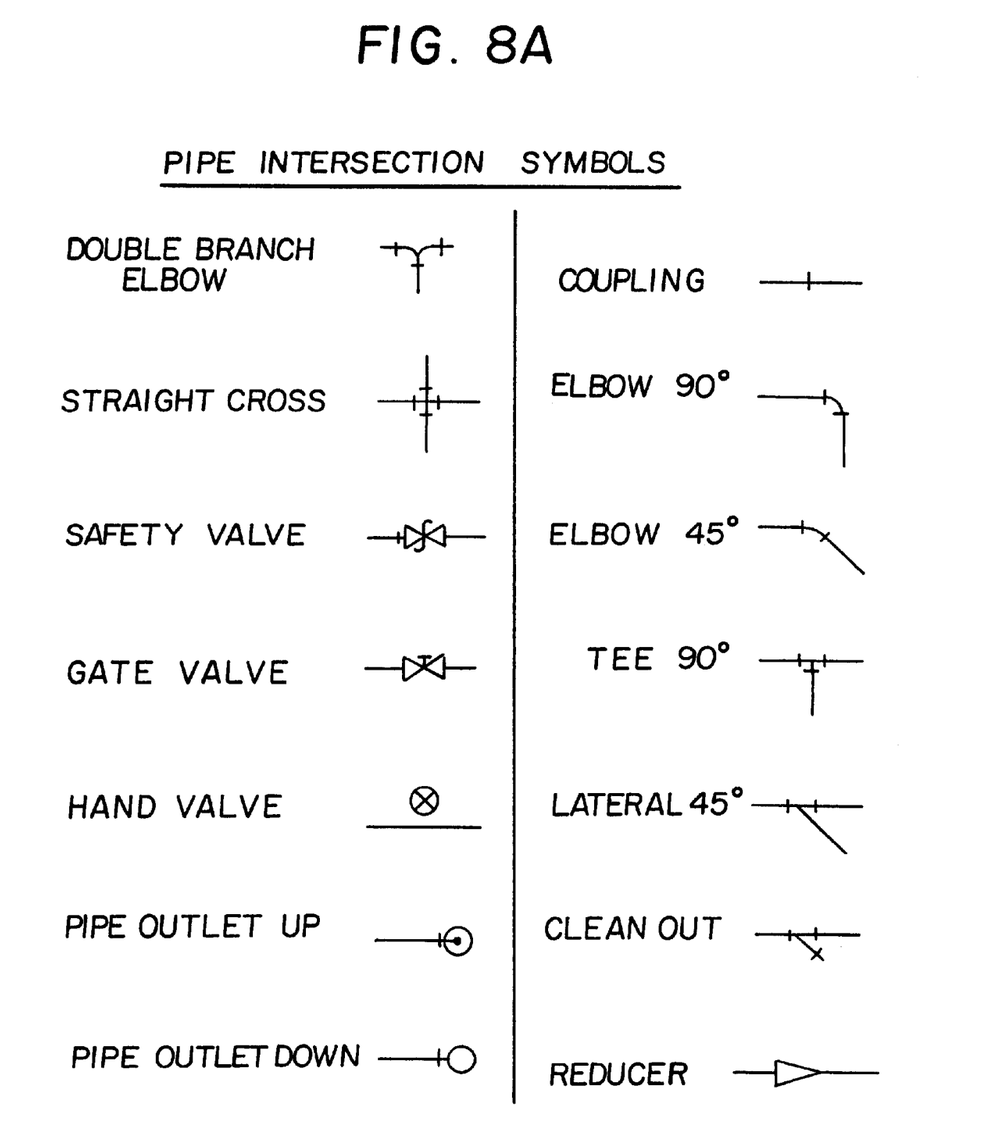
FIG. 8A is a list of preferred architectural symbols and descriptions for use on overlay labels.
Figure 8B:
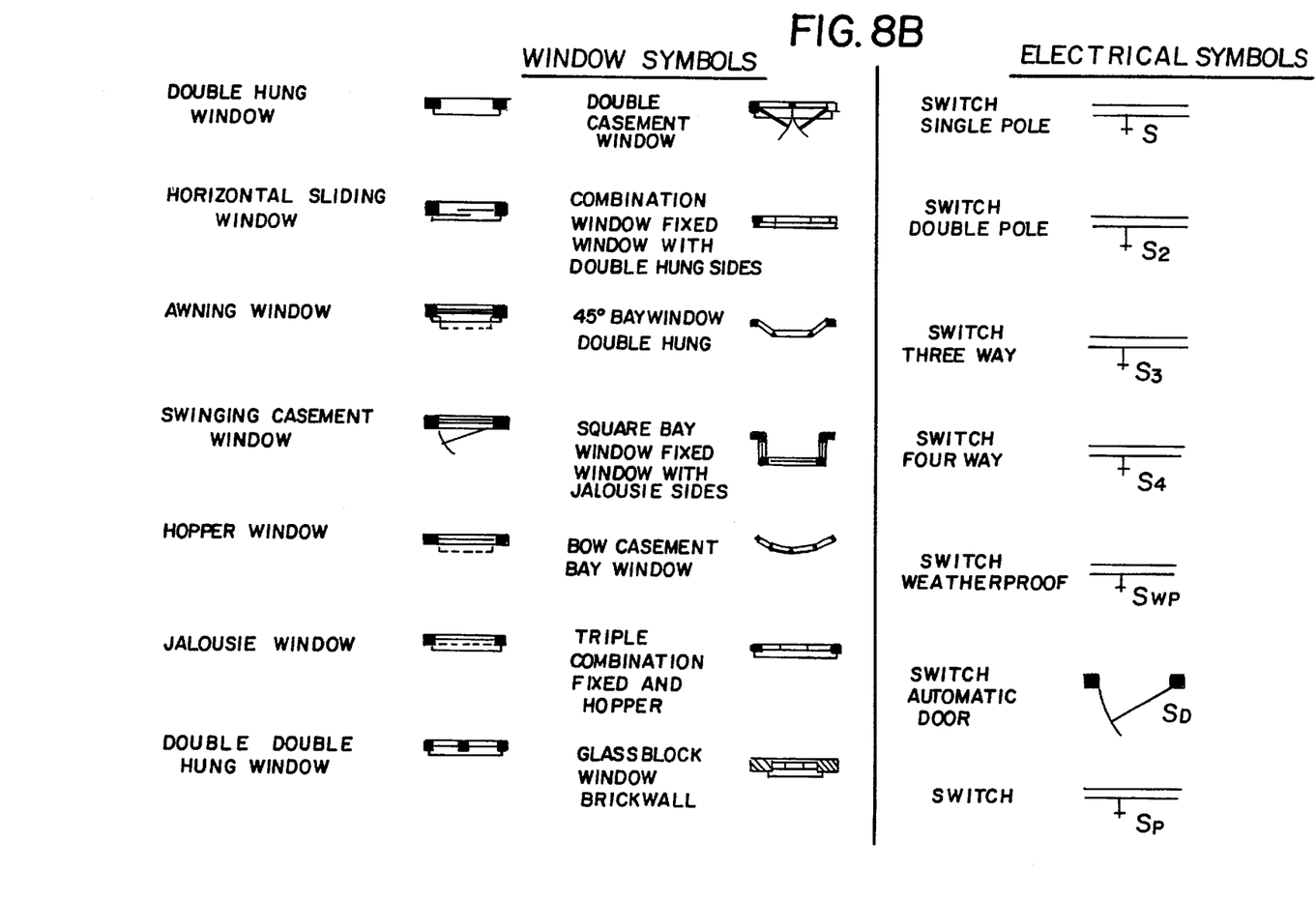
FIG. 8B is a list of preferred architectural symbols and descriptions for use on overlay labels.
Figure 8C:
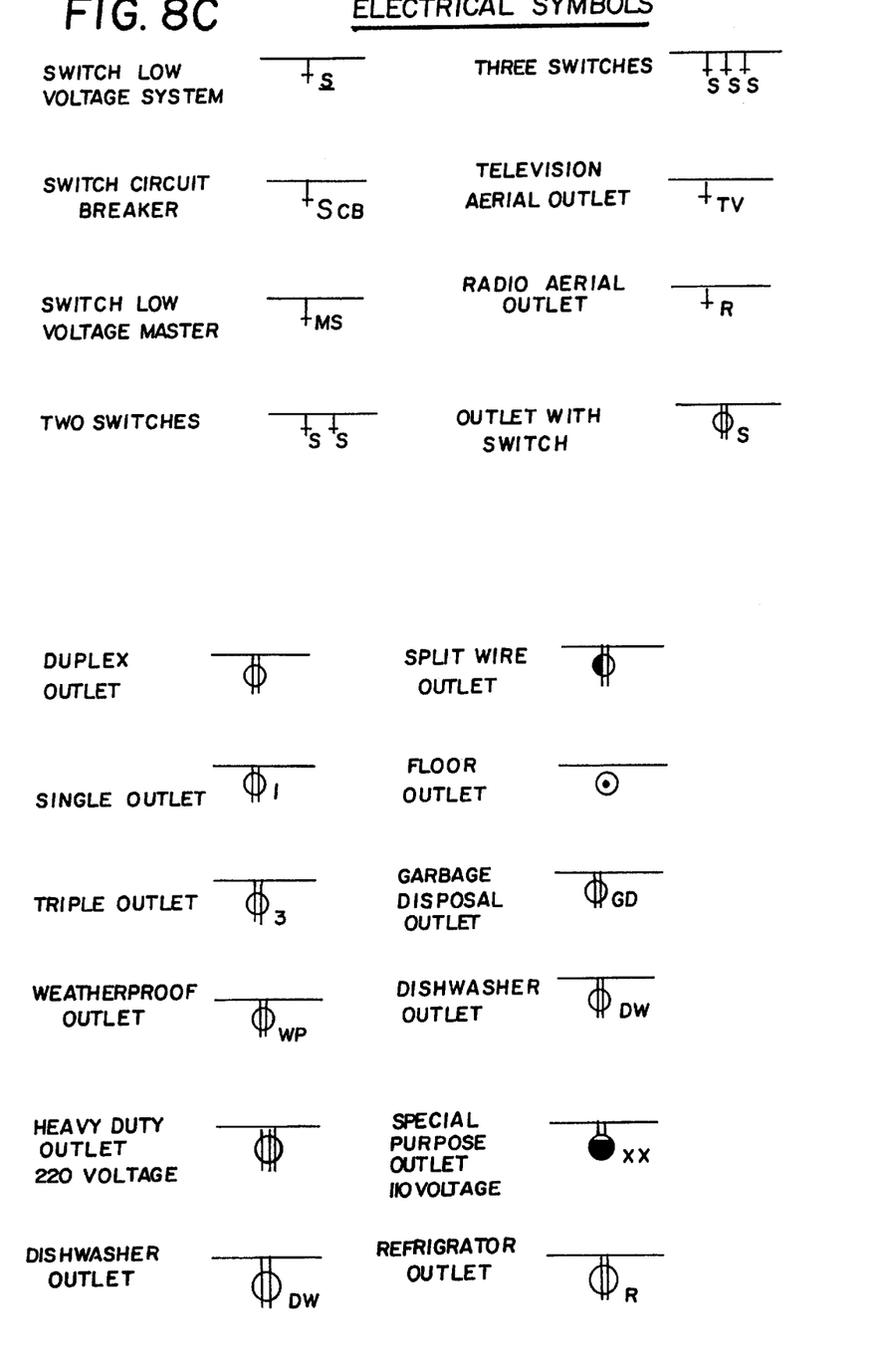
FIG. 8C is a list of preferred architectural symbols and descriptions for use on overlay labels.

FIGS. 6, 7 and 8 show several symbolic indicators and descriptions which can be used on overlay labels 60 including but not limited to climate-control symbols, sanitary facility symbols, door symbols, pipe joint symbols, electrical symbols, pipe intersection symbols, and window symbols.

Therefore, the present invention has several advantages over the prior art. The system allows a foreman to lay out the dimensions of a structure and minimize the opportunities for re-measurement error to occur. The system places the dimensions of a structure permanently on the base of the structure so that the system remains visible for each tradesman to erect his or her assigned components of the structure without need for re-measurement of the dimensions of the structure. Furthermore, the dimensions and location of each component of the structure will be available for future reference on the base of the structure so that installed components can be easily located for future repair, modification or removal.

In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

REFERENCE NUMBERS tape—10
tape width—14
end of tape—12
leader—15
graduated lines—17
information box—19
first calibrated edge—20
tape centerline—22
first chalk line indicator—24
zero line—25
second calibrated edge—30
second chalk line indicator—34
stud placement indicators—40
first stud placement indicator—42
stud placement indicator width—45
overlay label—60
overlay label length—61
overlay label centerline—62
first overlay label chalk line indicator—64
second overlay label chalk line indicator—66
first symbolic indicator—70
first symbolic indicator description space—71
first symbolic description—72
first symbolic indicator space—73
second symbolic indicator—75
second symbolic indicator description space—76
second symbolic description—77
second symbolic indicator space—78 overlay label width—80
base plate—100
studs—110
duplex outlet—120
light switch—125
cripple—130
window—140
carpet—145
surfacing component—150
HVAC component—160
plumbing component—170

What is claimed is:

1. A system for laying out an installation of components of a structure comprising:

a length of tape comprising a first calibrated edge and a second calibrated edge separated by a width sufficient in size so that said first and second calibrated edges remain visible after installation of the components of the structure; and, at least one overlay label connectable to the length of tape comprising a length and a symbolic indicator for placement of a component of the structure.

2. The system as defined in claim 1, wherein said length of tape further comprises an adhesive backing and at least one overlay label further comprises an adhesive backing.

3. A system for laying out an installation of components of a structure comprising:

a length of tape comprising a first calibrated edge and a second calibrated edge separated by a width sufficient in size so that said first and second calibrated edges remain visible after installation of the components of the structure, a plurality of stud placement indicators marked on said length of tape at periodic intervals; a leader depending from a zero line of the first and second calibrated edges, said leader comprising a length and a plurality of graduated lines indicating the length of the leader; an adhesive backing; and, at least one overlay label connectable to the length of tape and comprising a length sufficient in size so that a symbolic indicator will remain visible after installation of the components of the structure; an adhesive backing; and a symbolic indicator for placement of a component of the structure.

4. The system as defined in claim 3 wherein each stud indicator is orderly counted.

5. The system as defined in claim 3 wherein said length of tape and at least one overlay label are transparent.

6. The system as defined in claim 3 wherein at least one overlay label is color-coded to symbolize a component of the structure.

7. The system as defined in claim 3 wherein said length of tape further comprises a centerline, a first chalk line indicator and a second chalk line indicator and at least one overlay label further comprises a centerline, a first chalk line indicator and a second chalk line indicator.

8. The system as defined in claim 3 wherein said length of tape further comprises an information box located opposite the leader on the length of tape.

9. The system as defined in claim 3 wherein said length of tape and at least one overlay label resist distortion to maintain a specific measurement tolerance.

10. The system as defined in claim 7 wherein each first chalk line indicator and second chalk line further comprises differing colors.

11. A system for laying out an installation of components of a structure comprising:

a length of tape comprising a first calibrated edge and a second calibrated edge separated by a width sufficient in size so that said first and second calibrated edges remain visible after installation of the components of the structure; a plurality of stud placement indicators marked on said length of tape at periodic intervals; a leader depending from a zero line of the first and second calibrated edges, said leader comprising a length and a plurality of graduated lines indicating the length of the leader; an adhesive backing; and, at least one overlay label connectable to the length of tape and comprising a length sufficient in size so that a symbolic indicator will remain visible after installation of the components of the structure; a width substantially equivalent in size to a dimension of a component of the structure; an adhesive backing; a symbolic indicator for placement of a component of the structure; and, a written description of the symbolic indicator.

12. A system for laying out an installation of components of a structure comprising:

a length of tape comprising a first calibrated edge and a second calibrated edge separated by a width sufficient in size so that said first and second calibrated edges remain visible after installation of the components of the structure; a plurality of stud placement indicators marked on said length of tape at periodic intervals; a leader depending from a zero line of the first and second calibrated edges, said leader comprising a length and a plurality of graduated lines indicating the length of the leader; an adhesive backing; and, at least one overlay label connectable to the length of tape and comprising a length sufficient in size so that a symbolic indicator will remain visible after installation of the components of the structure; a width substantially equivalent in size to a dimension of a component of the structure; an adhesive backing; a symbolic indicator for placement of a component of the structure; and, a space for application of a written description of the symbolic indicator.

13. A method for laying out components of a structure comprising at least one wall on a fixed base comprising the following steps:

first, a length of tape is placed on the fixed base, the length of tape comprising a first calibrated edge and a second calibrated edge separated by a width sufficient in size so that said first and second calibrated edges remain visible after installation of the components of the structure, a first chalk line indicator, a second chalk line indicator, a plurality of stud placement indicators marked on said length of tape at periodic intervals, an adhesive backing, and a leader depending from a zero line of the first and second calibrated edges, said leader comprising a length and a plurality of graduated lines indicating the length of the leader;

second, the leader is cut along one of the graduated lines to indicate the thickness of any surfacing component to be adjacent to the wall; the first and second steps are repeated for each wall of the structure;

third, an overlay label, which is connectable to the length of tape, is placed across the width of said length of tape to indicate a location for a component of the structure; said overlay label comprising a length sufficient in size so that a symbolic indicator will remain visible after installation of the components of the structure, a width substantially equivalent in size to a dimension of the component of the structure, an adhesive backing and a symbolic indicator for placement of a component of the structure comprising an architectural symbol representing the component of the structure; the third step is repeated for each component of the structure; and, fourth, the components of the structure are installed over each installed length of tape and overlay label as indicated by each installed length of tape and overlay label such that the first and second calibrated edges of each length of tape and the symbolic indicator of each overlay label remains visible after the components are installed.

14. In combination, a structure and a system for laying out an installation of components of a structure; the structure comprising a plurality of components including a surfacing component; and the system comprising a length of tape comprising a first calibrated edge and a second calibrated edge separated by a width sufficient in size so that said first and second calibrated edges remain visible after installation of the surfacing component of the structure; and at least one overlay label connectable to the length of tape comprising a length and a symbolic indicator for placement of one component of the structure.

15. The combination of the system and structure of claim 14 wherein the surfacing component of the structure comprises sheetrock.

16. A system for laying out an installation of components of a structure comprising:

a length of tape comprising a first calibrated edge and a second calibrated edge separated by a width of at least four inches and wherein the width is sufficient in size so that said first and second calibrated edges remain visible after installation of the components of the structure; and, at least one overlay label connectable to the length of tape comprising a length and a symbolic indicator for placement of a component of the structure; wherein the length of at least one overlay label is at least four inches.

17. The system of claim 16 wherein said length of tape further comprises a plurality of stud placement indicators.

18. The system of claim 17 wherein each stud placement indicator is consecutively numbered.

19. The system of claim 16 wherein said length of tape further comprises a leader depending from a zero line of the first and second calibrated edges, said leader comprising a length and a plurality of graduated lines indicating the length of the leader.

20. The system of claim 16 wherein said symbolic indicator comprises an architectural symbol for the component of the structure.

* * * * *